US012607476B1

(12) United States Patent　　(10) Patent No.: US 12,607,476 B1

Smith　　(45) Date of Patent: Apr. 21, 2026

---

(54) MULTI-FUNCTIONAL WALKING CANE AND ASSOCIATED USE THEREOF

(71) Applicant: Brian Smith, Houston, TX (US)

(72) Inventor: Brian Smith, Houston, TX (US)

( * ) Notice: Subject to any disclaimer, the term of this patent is extended or adjusted under 35 U.S.C. 154(b) by 1654 days.

(21) Appl. No.: 15/243,928

(22) Filed: Aug. 22, 2016

Related U.S. Application Data

(60) Provisional application No. 62/207,977, filed on Aug. 21, 2015.

(51) Int. Cl.

| | |
|---|---|
| *A61H 3/06* | (2006.01) |
| *A45B 3/00* | (2006.01) |
| *A45B 7/00* | (2006.01) |
| *A45B 9/00* | (2006.01) |
| *A45B 9/02* | (2006.01) |
| *A45B 9/04* | (2006.01) |
| *G01C 21/26* | (2006.01) |
| *G01C 21/36* | (2006.01) |
| *G01J 5/10* | (2006.01) |
| *G01S 19/14* | (2010.01) |
| *H04R 1/10* | (2006.01) |

(52) U.S. Cl.
CPC ........... *G01C 21/3629* (2013.01); *A45B 3/00* (2013.01); *A45B 7/00* (2013.01); *A45B 9/02* (2013.01); *A45B 9/04* (2013.01); *A61H 3/061* (2013.01); *A61H 3/068* (2013.01); *G01C 21/265* (2013.01); *G01C 21/3652* (2013.01); *G01J 5/10* (2013.01); *G01S 19/14* (2013.01);

*A45B 2009/002* (2013.01); *A61H 2003/065* (2013.01); *A61H 2201/5023* (2013.01); *H04R 1/1091* (2013.01)

(58) Field of Classification Search
CPC .. G01C 21/3629; G01C 21/3423; G01S 19/51
USPC ......................................................... 701/428
See application file for complete search history.

(56) References Cited

U.S. PATENT DOCUMENTS

| | | | | | |
|---|---|---|---|---|---|
| 5,682,030 | A | * | 10/1997 | Kubon ............... | G06K 7/10881 |
| | | | | | 235/462.25 |
| 6,011,481 | A | * | 1/2000 | Luther ..................... | A61H 3/02 |
| | | | | | 135/66 |
| 8,812,231 | B1 | * | 8/2014 | Brickous ................ | A61H 3/068 |
| | | | | | 701/488 |
| 9,044,374 | B1 | * | 6/2015 | Stimpson ............... | A61H 3/061 |

(Continued)

*Primary Examiner* — Khoi H Tran

(74) *Attorney, Agent, or Firm* — Ashkan Najafi

(57) ABSTRACT

A multi-functional walking cane includes an elongated rectilinear shaft having a centrally registered longitudinal axis, a handle adjustably coupled to the shaft, and a portable controller removably coupled to the shaft and spaced subjacent to the handle. Advantageously, the controller includes a programmable navigation determining mechanism, and an object-detecting mechanism in communication with the programmable navigation determining mechanism. In this manner, the controller cooperates with the programmable navigation determining mechanism and the object-detecting mechanism to thereby generate and emit output signals that facilitate directional travel for the blind user while preventing undesirable contact with hazardous obstacles during the directional travel. Notably, a portable earpiece is in wireless communication with the controller. Such an earpiece has a speaker for audibly emitting the output signals to the blind user.

5 Claims, 8 Drawing Sheets

(56)                    References Cited

U.S. PATENT DOCUMENTS

2006/0129308 A1 *   6/2006   Kates ..................... A61H 3/061
                                                          701/532
2006/0254633 A1 *   11/2006  Willis ..................... A45B 9/00
                                                          135/74
2016/0295978 A1 *   10/2016  Hyde ....................... A61H 3/02

* cited by examiner

11

28

MULTI-FUNCTIONAL WALKING CANE AND ASSOCIATED USE THEREOF

CROSS REFERENCE TO RELATED APPLICATIONS

This is a non-provisional patent application that claims the benefit of U.S. provisional patent application No. 62/207,977 filed Aug. 21, 2015, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to walking canes and, more particularly, to a multi-functional walking cane configured for use by those who suffer blindness, and thereby providing directional and safety vocalizations to the user via sensor activation and an incorporated earpiece.

Prior Art

With approximately 10 million blind and visually impaired people in the United States, it is becoming increasingly clear that those with vision problems need all the help they can get, in many aspects of daily living. Specifically, the simple act of walking through one's neighborhood can be extremely challenging for those who suffer visual impairment. Those who have varying degrees of blindness will employ a white cane as a means of alerting others to their impairment, as well as monitoring ground conditions. By using a cane, a blind person is able to discern breaks in a sidewalk, steps, or even puddles to avoid. Still, as practical as these devices are, improvements to their design that facilitate enhanced use are always welcome.

Accordingly, a need remains for a multi-functional walking cane in order to overcome at least one aforementioned shortcoming. The exemplary embodiment(s) satisfy such a need by providing a multi-functional walking cane configured for use by those who suffer blindness that is convenient and easy to use, lightweight yet durable in design, versatile in its applications, and designed for and thereby providing directional and safety vocalizations to the user via sensor activation and an incorporated earpiece.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a multi-functional walking cane configured for providing directional and safety vocalizations to a blind user. These and other objects, features, and advantages of the non-limiting exemplary embodiment(s) are provided by the multi-functional walking cane includes an elongated rectilinear shaft having a centrally registered longitudinal axis, a handle adjustably coupled to the shaft, and a portable controller removably coupled to the shaft and spaced subjacent to the handle. Advantageously, the controller includes a programmable navigation determining mechanism, and an object-detecting mechanism in communication with the programmable navigation determining mechanism. In this manner, the controller cooperates with the programmable navigation determining mechanism and the object-detecting mechanism to thereby generate and emit output signals that facilitate directional travel for the blind user while preventing undesirable contact with hazardous obstacles during the directional travel. Notably, a portable earpiece is in wireless communication with the controller. Such an earpiece has a speaker for audibly emitting the output signals to the blind user.

In a non-limiting exemplary embodiment, the output signals include vocalized turn-by-turn navigation directions along a pathway to a specified location associated with the directional travel, and vocalized instructions warning the blind user of imminent obstacles located in the pathway.

In a non-limiting exemplary embodiment, the shaft includes a female section, a male section telescopically engaged with the female section, a bracket detachably connected to the female section, and an anchor mated to the bracket. In this manner, the handle is rotatably engaged to the anchor such that the handle is freely pivoted about the centrally registered longitudinal axis.

In a non-limiting exemplary embodiment, the programmable navigation determining mechanism includes a braille user interface affixed to an outer surface of the controller, and a GPS enabled transceiver in communication with the braille user interface for receiving and transmitting location coordinates.

In a non-limiting exemplary embodiment, the object-detecting mechanism includes a plurality of support legs outwardly deployed to a tri-pod configuration exterior of the shaft, a plurality of sensors attached to the support legs, respectively, and an infrared detector for identifying a detection zone in a proximate vicinity of the shaft.

In a non-limiting exemplary embodiment, the object-detecting mechanism further includes a vibrating compass rose attached to the handle. Advantageously, the sensors monitor the detection zone and, upon detecting the obstacle in the pathway, generate and transmit alert signals to the controller so that the compass rose vibrates in a desired direction away from the obstacle and the earpiece audibly alerts the blind user of the obstacle location.

In a non-limiting exemplary embodiment, the anchor is threadably affixed to the bracket and the bracket is threadably affixed to the shaft. In this manner, the anchor is intercalated between the handle and the bracket.

In a non-limiting exemplary embodiment, the handle is swivel-mounted to the anchor.

The present disclosure further includes a method of utilizing a multi-functional walking cane configured for providing directional and safety vocalizations to a blind user. Such a method includes the steps of: providing an elongated rectilinear shaft having a centrally registered longitudinal axis; providing and adjustably coupling a handle to the shaft; providing and removably coupling a portable controller to the shaft such that the controller is spaced subjacent to the handle. Advantageously, the controller includes a programmable navigation determining mechanism, and an object-detecting mechanism in communication with the programmable navigation determining mechanism.

The method further includes the steps of: providing a portable earpiece having a speaker; wirelessly communicating the earpiece with the controller; the controller cooperating with the programmable navigation determining mechanism and the object-detecting mechanism thereby generating and emitting output signals that facilitate directional travel for the blind user while preventing undesirable contact with hazardous obstacles during the directional travel; and the speaker audibly emitting the output signals to the blind user.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
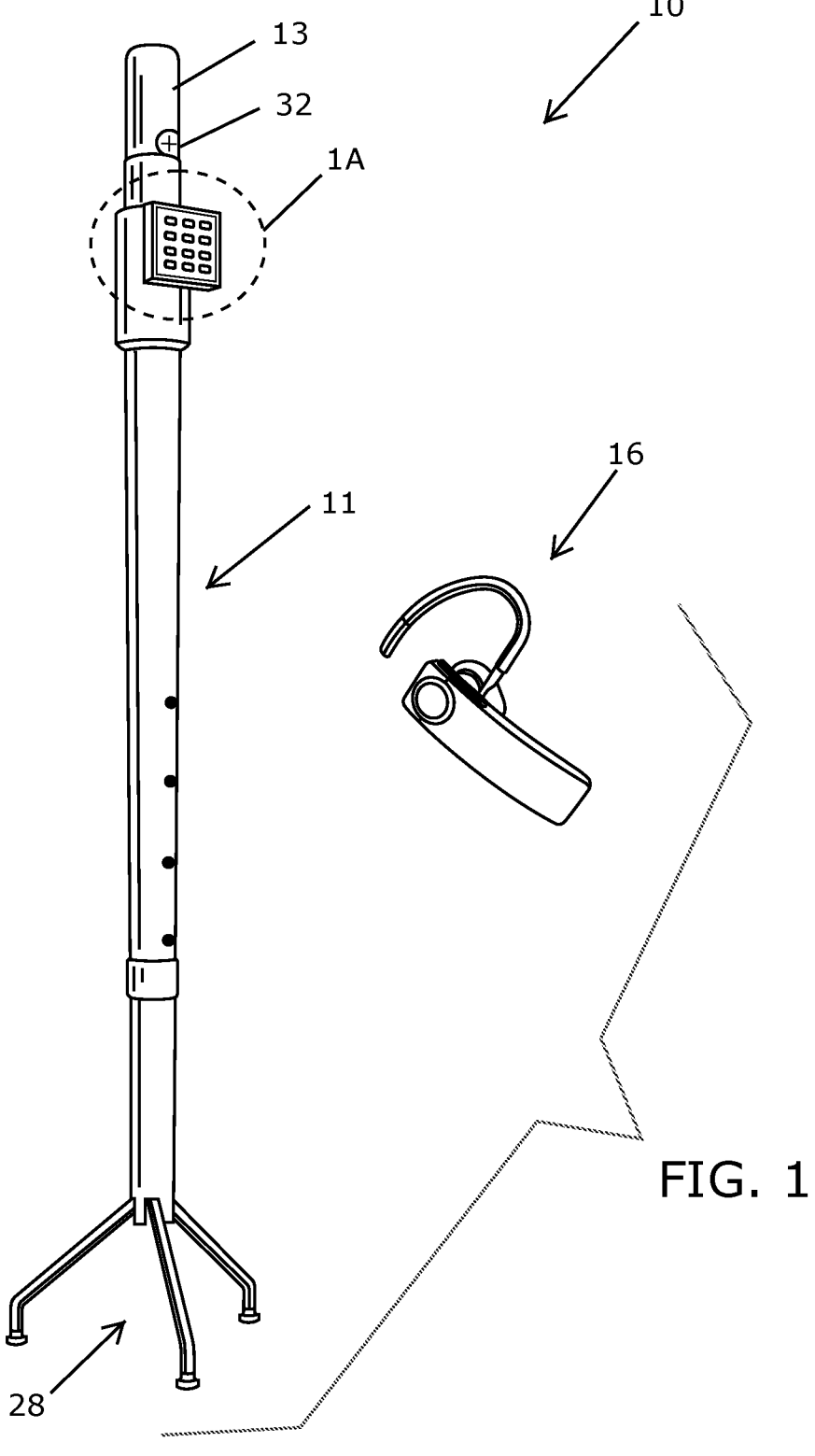
FIG. 1 is a perspective view of a multi-functional walking cane having a handle vertically aligned with its shaft, in accordance with a non-limiting exemplary embodiment.
Figure 1A:
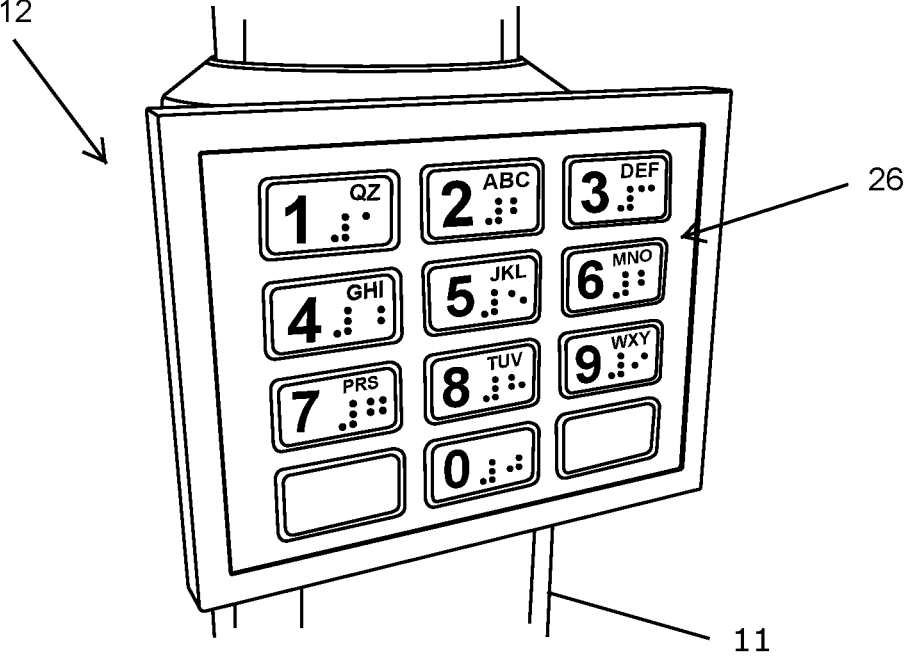
FIG. 1A is an enlarged perspective view of the controller and braille user interface illustrated in FIG. 1A.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means ±15% of the numerical.

If used herein, "substantially" means largely if not wholly that which is specified but so close that the difference is insignificant.

Figure 2:
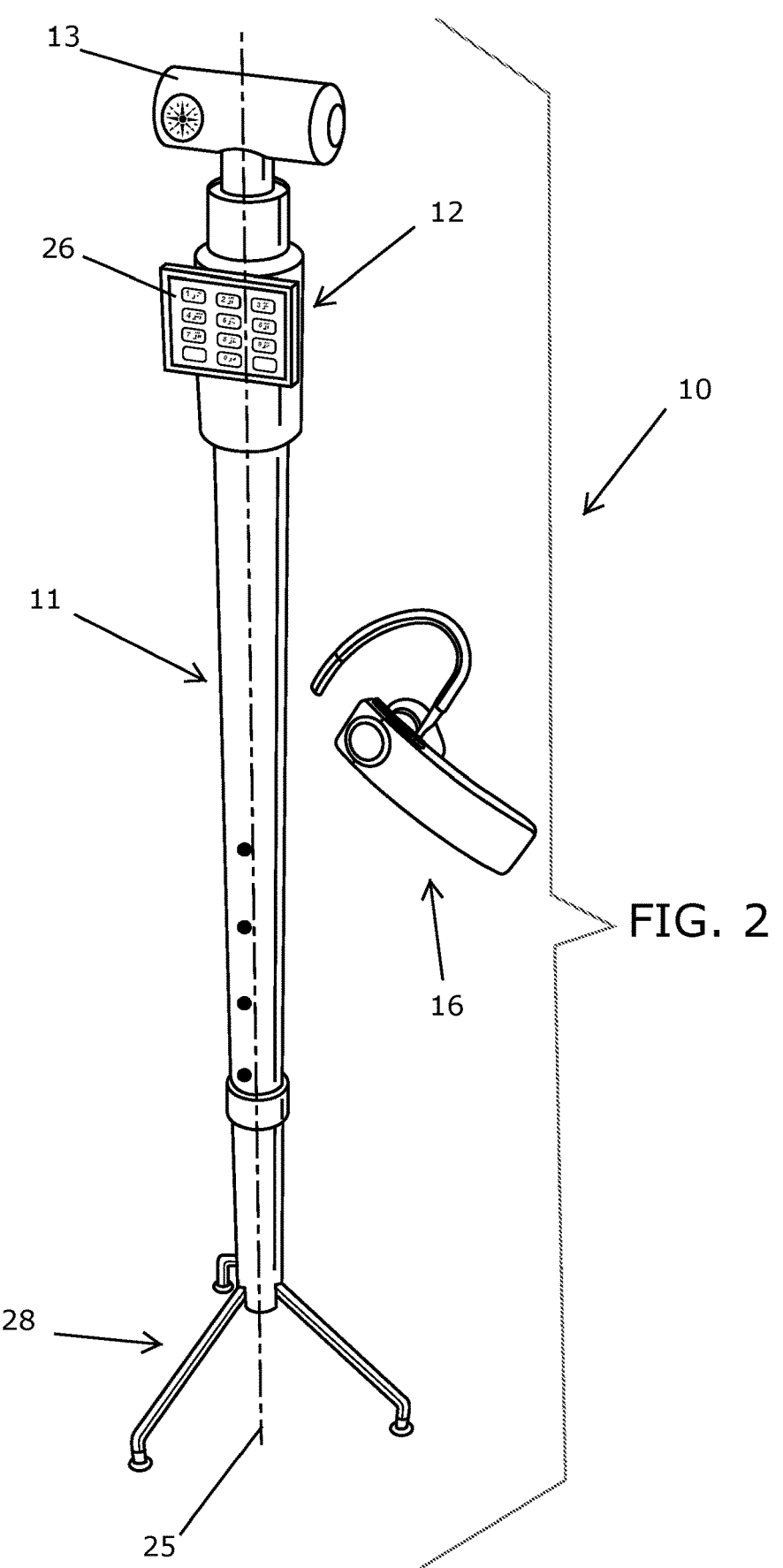
FIG. 2 is a perspective view of the multi-functional cane having an adjustable (e.g., swivel) handle registered orthogonal to the shaft, in accordance with a non-limiting exemplary embodiment.
Figure 2A:
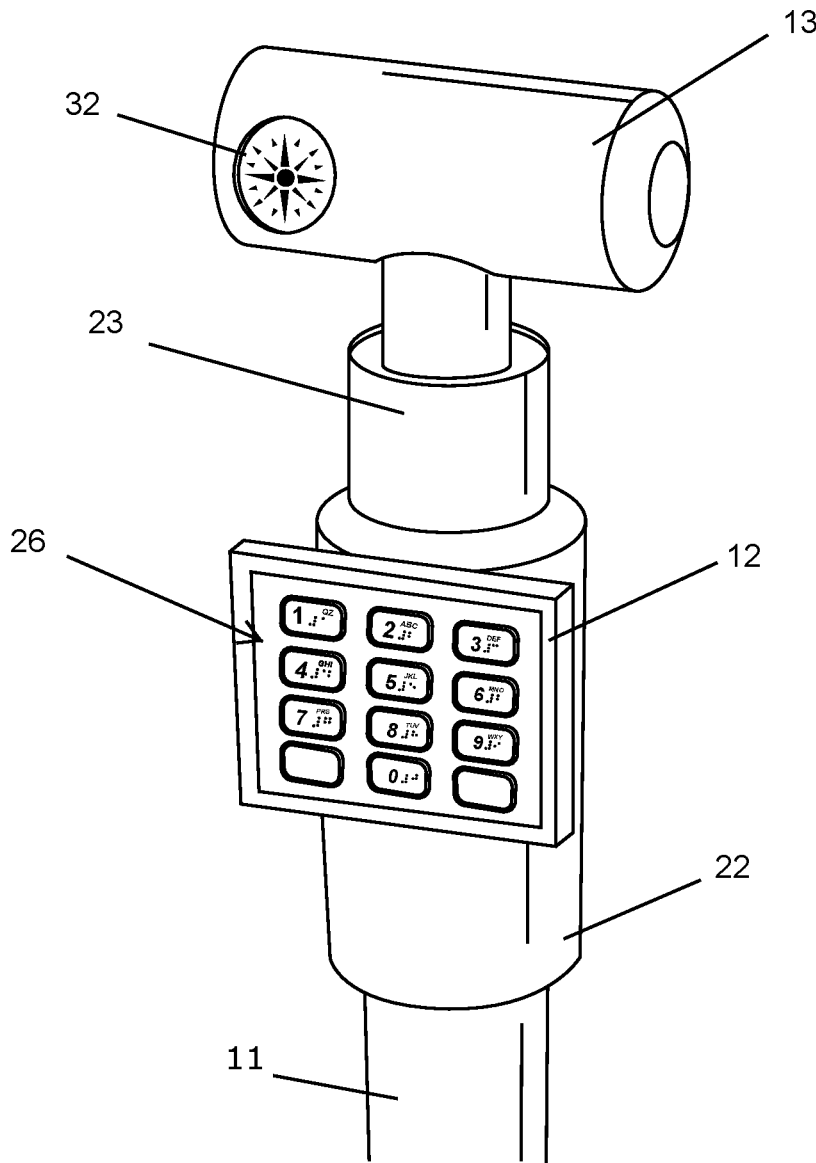
FIG. 2A is an enlarged perspective view of the controller and braille user interface illustrated in FIG. 2.
Figure 3:
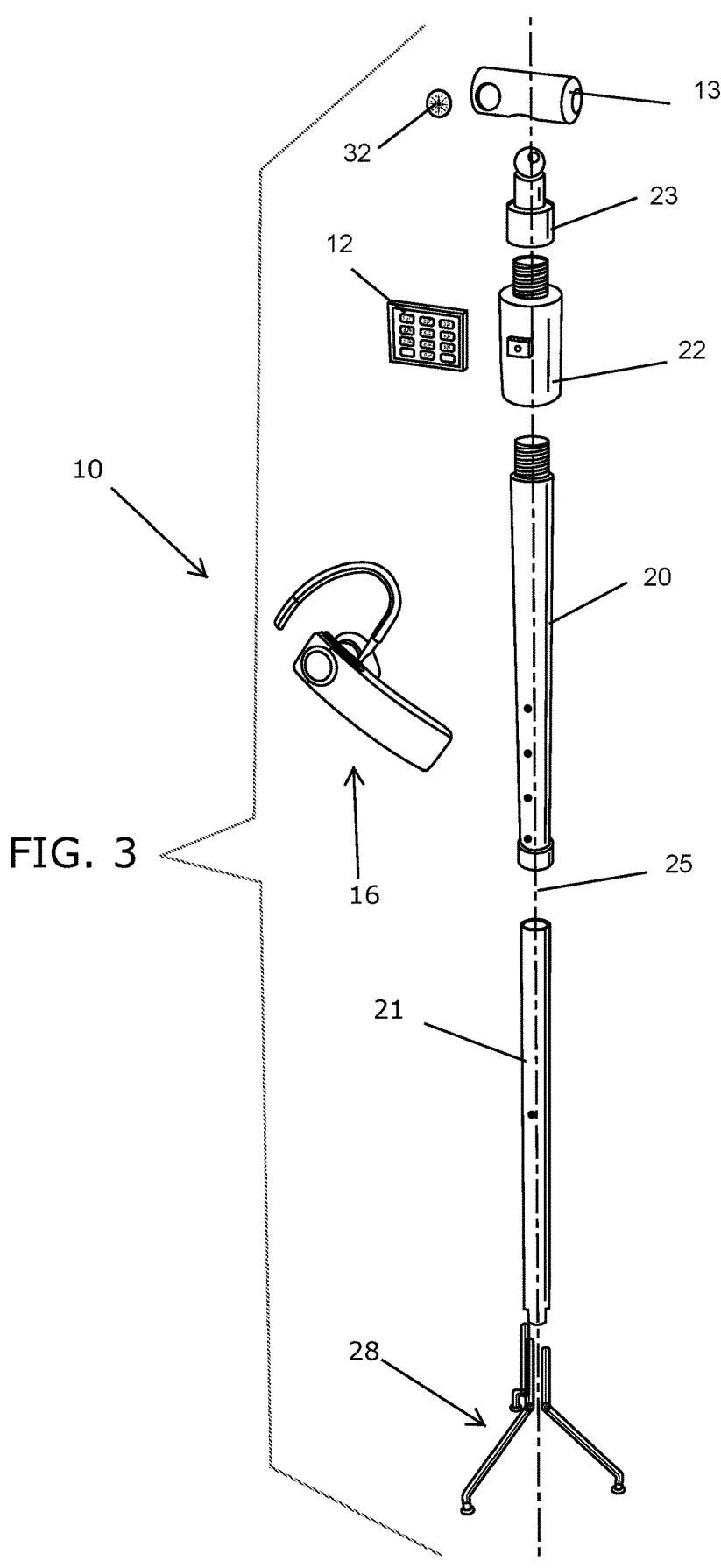
FIG. 3 is an exploded view of the multi-functional cane illustrated in FIG. 2.
Figure 4:
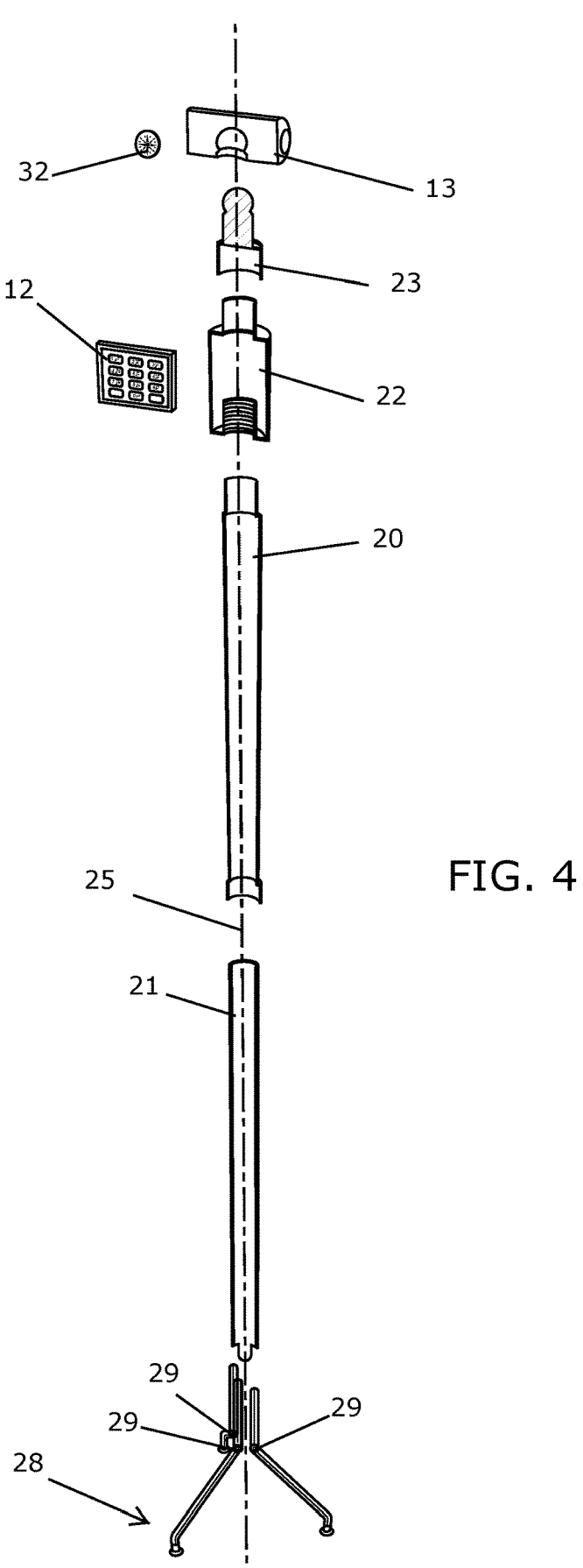
FIG. 4 is a cross-sectional view along a longitudinal length of the shaft illustrated in FIG. 3.
Figure 5:
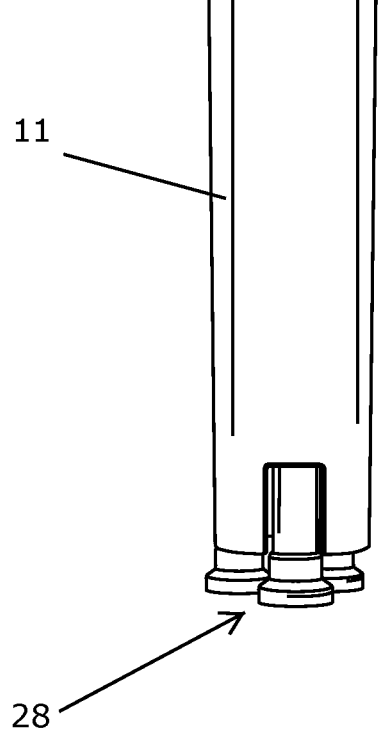
FIG. 5 is an enlarged front elevational of the support legs retracted upwardly into a distal end of the shaft.
Figure 6:
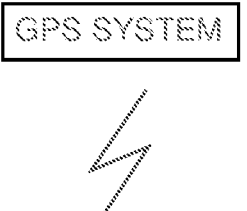
FIG. 6 is a schematic block diagram illustrating the interrelationship between select electronic components of the present disclosure.
Figure 6:
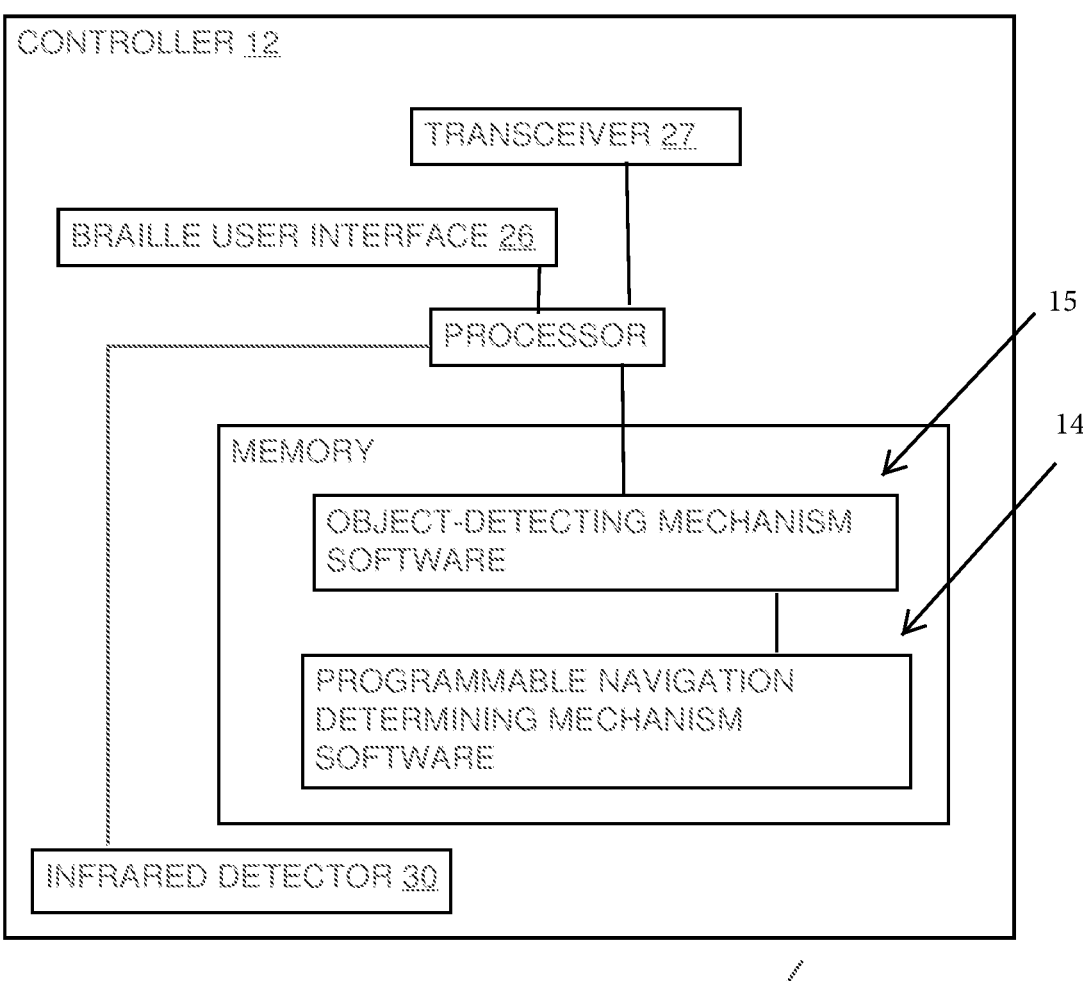

The non-limiting exemplary embodiment(s) is/are referred to generally in FIGS. 1-6 and is/are intended to provide a multi-functional walking cane 10 configured for providing directional and safety vocalizations to a blind user. The multi-functional walking cane 10 includes an elongated rectilinear shaft 11 having a centrally registered longitudinal axis 25, a handle 13 adjustably coupled to the shaft 11, and a portable controller 12 removably coupled to the shaft 11 and spaced subjacent to the handle 13. Advantageously, the controller 12 includes a programmable navigation determining mechanism 14, and an object-detecting mechanism 15 in communication with the programmable navigation determining mechanism 14. In this manner, the controller 12 cooperates with the programmable navigation determining mechanism 14 and the object-detecting mechanism 15 to thereby generate and emit output signals (e.g., audible signals sent to the earpiece 16) that facilitate directional travel for the blind user while preventing undesirable contact with hazardous obstacles (e.g., tree limb, trashcan, fire hydrant, etc.) during the directional travel. Notably, a portable earpiece 16 is in wireless communication with the controller 12. Such an earpiece 16 has a speaker 17 for audibly emitting the output signals to the blind user.

As a non-limiting example, the multi-functional walking cane 10 is programmed with preset guides based on the blind user's typical route, configured with Global Positioning System (GPS) technology. GPS satellites send out signals to be detected by transceiver 27 inside controller 12. The transceiver 27 communicates with several satellites overhead and communicates with the programmable navigation determining mechanism 14 for calculating position information such as altitude, latitude, and longitude, for example. Upon learning such coordinate information supplied by the GPS satellites, the programmable navigation determining mechanism 14 applies it to its internal, electronic map, thereby sonically pointing out to the blind user where he/she is located in relation to nearby roads, bodies of water, or other landmarks. The entire route taken by the blind user is conveyed, vocally leading him/her to his/her destination and back home again. The programmable navigation determining mechanism 14 may be embodied as a computer software application residing on memory communicatively coupled to a processor at controller 12. The computer software application includes various control logic algorithm modules, when executed by the processor, enable the programmable navigation determining mechanism 14 to perform its intended functions. Such a computer software application is well-known in the industry.

In a non-limiting exemplary embodiment, the output signals include vocalized turn-by-turn navigation directions along a pathway (e.g., walking route of the blind user) to a specified location (e.g., rest stops, landmarks, destination, etc.) associated with the directional travel, and vocalized instructions warning the blind user of imminent obstacles (e.g., hazardous objects such as fallen tree limbs, bicycles, fire hydrants, cars, etc.) located in the pathway.

In a non-limiting exemplary embodiment, the programmable navigation determining mechanism 14 includes a braille user interface 26 affixed to an outer surface of the controller 12, and a GPS enabled transceiver 27 in communication with the braille user interface 26 for receiving and transmitting location coordinates.

In a non-limiting exemplary embodiment, the object-detecting mechanism 15 includes a plurality of support legs 28 outwardly deployed to a tri-pod configuration exterior of the shaft 11, a plurality of sensors 29 attached to the support legs 28, respectively, and an infrared detector 30 for identifying a detection zone (e.g., imminent area surrounding the blind user) in a proximate vicinity of the shaft 11.

In a non-limiting exemplary embodiment, the object-detecting mechanism 15 further includes a vibrating compass rose 32 attached to the handle 13. Advantageously, the sensors 29 monitor the detection zone and, upon detecting the obstacle in the pathway, generate and transmit alert signals to the controller 12 so that the compass rose 32 vibrates in a desired direction away from the obstacle and the earpiece 16 audibly alerts the blind user of the obstacle location. For example, a first, second, third or fourth quadrant of the compass rose 32 may vibrate to alert the blind user to travel in a direction associated with the vibrating quadrant. Alternately, the compass rose 32 may be programmed to vibrate in a specific sequence or pattern to instruct the blind user to walk faster, slower, etc. along the pathway. The object-detecting mechanism 15 may be embodied as a computer software application residing on memory communicatively coupled to a processor at controller 12. The computer software application includes various control logic algorithm modules, when executed by the processor, enable the object-detecting mechanism 15 to perform its intended functions. Such a computer software application is well-known in the industry.

It is noted that advantageous features are embodied in the communication between the object-detecting mechanism 15 and programmable navigation determining mechanism 14, for assisting the blind user to learn an optimum pathway via directional travel while simultaneously avoiding unexpected obstacles located in the optimum pathway.

In a non-limiting exemplary embodiment, the shaft 11 includes a female section 20, a male section 21 telescopically engaged with the female section 20, a bracket 22 detachably connected to the female section 20, and an anchor 23 mated to the bracket 22. In this manner, the handle 13 is rotatably engaged to the anchor 23 such that the handle 13 is freely pivoted about the centrally registered longitudinal axis 25.

In a non-limiting exemplary embodiment, the anchor 23 is threadably affixed to the bracket 22 and the bracket 22 is threadably affixed to the shaft 11. In this manner, the anchor 23 is intercalated between the handle 13 and the bracket 22.

In a non-limiting exemplary embodiment, the handle 13 is swivel-mounted to the anchor 23.

The present disclosure further includes a method of utilizing a multi-functional walking cane 10 configured for providing directional and safety vocalizations to a blind user. Such a method includes the steps of: providing an elongated rectilinear shaft 11 having a centrally registered longitudinal axis 25; providing and adjustably coupling a handle 13 to the shaft 11; providing and removably coupling a portable controller 12 to the shaft 11 such that the controller 12 is spaced subjacent to the handle 13. Advantageously, the controller 12 includes a programmable navigation determining mechanism 14, and an object-detecting mechanism 15 in communication with the programmable navigation determining mechanism 14.

The method further includes the steps of: providing a portable earpiece 16 having a speaker 17; wirelessly communicating the earpiece 16 with the controller 12; the controller 12 cooperating with the programmable navigation determining mechanism 14 and the object-detecting mechanism 15 thereby generating and emitting output signals that facilitate directional travel for the blind user while preventing undesirable contact with hazardous obstacles during the directional travel; and the speaker 17 audibly emitting the output signals to the blind user.

Referring to the figures in general, in a non-limiting exemplary embodiment(s), the specially designed multi-functional walking cane 10 boasts a sensor-operated system that vocalizes turn-by-turn directions to a variety of specified locations while also providing ample warning of any obstacles that may be in a blind user's path. The multi-functional walking cane 10 employs an elongated, cylindrical shaped stainless steel walking shaft 11 that may be made available with telescoping adjustability to lengthen or contract the shaft 11 as needed for the individual user.

In a non-limiting exemplary embodiment, positioned at a proximal end of the shaft 11 is a swivel-mounted, ergonomically designed and breathable handle 13 designed for a firm and comfortable hold during use. Directly beneath this handle 13 is a rectangular, electronic controller 12 outlined with Braille directives, which provide a variety of navigational accoutrements of the multi-functional walking cane 10. Powered by a rechargeable battery source, controller 12 may be calibrated to accept voice activation/recognition. For example, commands such as addresses can be spoken into the controller 12, with the multi-functional walking cane 10 conveying the information to the blind user via a BLUETOOTH® earpiece 16 wirelessly connected to the controller 12.

As mentioned above, the multi-functional walking cane 10 offers sensor capabilities to detect any potentially hazardous obstacles encountered along the blind user's journey. A three-way sensor assembly is strategically positioned near a distal tip of the shaft 11, which expand outward into a tripod configuration, working in tandem with a compact "electronic eye" as a passive infrared detector 30, which sets up a zone of detection within a semicircular field of view using a Fresnel® lens, for example.

Upon detection of an obstacle, a vibrating element (e.g., compass rose) within the multi-functional walking cane 10 provides the warning necessary for avoiding stumbling over the sensed obstacle. Other beneficial attributes that are germane to the multi-functional walking cane 10 include: a "life alert"-type button that automatically calls for assistance (such as dialing 911) in the event of a medical emergency. Other features include a calendar reminder and a vocalized hourly clock.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A multi-functional walking cane configured for providing directional and safety vocalizations to a blind user, said multi-functional walking cane comprising:

a shaft having a centrally registered longitudinal axis;

a handle directly coupled to said shaft;

a controller removably coupled directly to said shaft and spaced subjacent to said handle, said controller including a programmable navigation determining mechanism, and an object-detecting mechanism in direct communication with said programmable navigation determining mechanism;

wherein said controller directly cooperates with said programmable navigation determining mechanism and said object-detecting mechanism to thereby generate and emit output signals that facilitate directional travel for the blind user while preventing undesirable contact with hazardous obstacles during the directional travel; and an earpiece communicatively coupled to said controller, said earpiece having a speaker for audibly emitting said output signals to the blind user;

wherein said shaft comprises:

a female section:

a male section telescopically engaged directly with said female section;

a bracket detachably connected directly to said female section; and an anchor mated directly to said bracket;

wherein said handle is rotatably engaged to said anchor, said handle being freely pivoted about the centrally registered longitudinal axis, wherein said programmable navigation determining mechanism comprises:

a braille user interface affixed directly to an outer surface of said controller; and a GPS enabled transceiver in communication with said braille user interface for receiving and transmitting location coordinates;

wherein said anchor is threadably affixed directly to said bracket, said bracket being threadably affixed directly to said shaft; wherein said anchor is intercalated directly between said handle and said bracket.

2. The multi-functional walking cane of claim 1, wherein said output signals comprise:

vocalized turn-by-turn navigation directions along a pathway to a specified location associated with said directional travel; and vocalized instructions warning the blind user of imminent obstacles located in said pathway.

3. The multi-functional walking cane of claim 2, wherein said object-detecting mechanism comprises:

a plurality of support legs outwardly deployed to a tri-pod configuration exterior of said shaft;

a plurality of sensors attached to said support legs, respectively; and an infrared detector for identifying a detection zone in a proximate vicinity of said shaft.

4. The multi-functional walking cane of claim 3, wherein said object-detecting mechanism further comprises: a vibrating compass rose directly attached and counter sunk relative to said handle;

wherein said sensors monitor said detection zone and, upon detecting the obstacle in said pathway, generate and transmit alert signals to said controller so that said compass rose vibrates in a desired direction away from the obstacle and said earpiece audibly alerts the blind user of the obstacle location.

5. The multi-functional walking cane of claim 3, wherein said handle is swivel-mounted directly to said anchor.

\* \* \* \* \*